US006758981B2

(12) United States Patent
Mazza et al.

(10) Patent No.: US 6,758,981 B2
(45) Date of Patent: Jul. 6, 2004

(54) METHOD AND APPARATUS FOR BY-PRODUCT REMOVAL IN A HYDROGEN GENERATION SYSTEM

(75) Inventors: Antonio G. Mazza, Whitby (CA); Ali Rusta-Sallehy, Richmond Hill (CA)

(73) Assignee: Hydrogenics Corporation, Mississauga (CA)

(*) Notice: Subject to any disclaimer, the term of this patent is extended or adjusted under 35 U.S.C. 154(b) by 371 days.

(21) Appl. No.: 10/024,539

(22) Filed: Dec. 21, 2001

(65) Prior Publication Data

US 2003/0118504 A1 Jun. 26, 2003

(51) Int. Cl.[7] .............................. C01B 6/34; C01B 3/10; B01D 9/00
(52) U.S. Cl. ...................... 210/774; 210/737; 210/781; 210/787; 422/198; 423/184; 423/658.2
(58) Field of Search ................................ 210/737, 774, 210/781, 787; 423/179.5, 179, 184, 646, 658.2; 422/198

(56) References Cited

U.S. PATENT DOCUMENTS

| 3,459,510 | A | 8/1969 | Litz et al. |
|---|---|---|---|
| 5,372,617 | A | 12/1994 | Kerrebrock |
| 5,804,329 | A | 9/1998 | Amendola |
| 6,143,359 | A | 11/2000 | Rendina |
| 6,195,999 | B1 | 3/2001 | Arnold et al. |
| 6,228,338 | B1 | 5/2001 | Petrie et al. |
| 2001/0038821 | A1 | 11/2001 | Petrie et al. |
| 2002/0025462 | A1 | 2/2002 | Nakanishi et al. |
| 2002/0182459 | A1 | 12/2002 | Hockaday et al. |
| 2003/0014917 | A1 | 1/2003 | Rusta-Sallehy et al. |
| 2003/0091876 | A1 | 5/2003 | Rusta-Sallehy et al. |
| 2003/0091877 | A1 | 5/2003 | Chen et al. |

FOREIGN PATENT DOCUMENTS

| EP | 1170249 A1 | 1/2002 |
|---|---|---|
| JP | 2002154803 | 5/2002 |
| WO | WO 01/51410 | 7/2001 |
| WO | WO 02/066369 | 8/2002 |

OTHER PUBLICATIONS

Amendola, S.C., et al., "A safe, portable, hydrogen gas generator using aqueous borohydride solution and Ru catalyst", International Journal of Hydrogen Energy, 25 (2000), pp. 969–975, Elsevier Science Ltd., GB.

Amendola, S.C., et al., "An ultrasafe Hydrogen Generator: Aqueous, Alkaline Borohydride Solutions and Ru Catalyst", Preprints of Symposia–American Chemical Society, Division of Fuel Chemistry, American Chemical Society, vol. 44, No. 4 1999, pp. 864–868.

Seifritz, W., "Letter to the Editior", International Journal of Hydrogen Energy, vol. 28, No. 4, Apr. 2000, p. 403, Elsevier Science Publishers B.V., Barking, GB.

Aiello, R., et al., "Production of Hydrogen Gas from Novel Chemical Hydrides", International Journal of Hydrogen Energy, vol. 23, No. 12, pp. 1103–1108, 1988, Elsevier Science Ltd., GB.

*Primary Examiner*—Steven Bos
*Assistant Examiner*—Maribel Medina
(74) *Attorney, Agent, or Firm*—Bereskin & Parr

(57) ABSTRACT

A system and method for removing a by-product from a chemical hydride solution is disclosed. The method includes the steps of: (a) withdrawing the chemical hydride solution at a first temperature from the reactor; (b) cooling the chemical hydride solution to a second temperature below the first temperature, wherein a precipitate is formed from a portion of the by-product; (c) removing the precipitate from the chemical hydride solution; (d) heating the chemical hydride solution to a third temperature above the second temperature, to dissolve the remaining precipitate; and (e) delivering the chemical hydride solution back to the reactor. The system is a circuit which includes: (a) a hydrogen reactor; (b) a pump for withdrawing the chemical hydride solution from the reactor and returning the chemical hydride solution to the reactor; (c) a cooling element for cooling the chemical hydride solution to a second temperature below the first temperature; (d) a separator for removing the precipitate from the chemical hydride solution; and (e) a heater for heating the chemical hydride solution to a third temperature.

34 Claims, 2 Drawing Sheets

METHOD AND APPARATUS FOR BY-PRODUCT REMOVAL IN A HYDROGEN GENERATION SYSTEM

FIELD OF THE INVENTION

The present invention relates to a hydrogen generation system. More particularly, the present invention relates to a method and system for by-product removal from a chemical hydride hydrogen generation system.

BACKGROUND OF THE INVENTION

Fuel cells are seen as a promising alternative to traditional power generation technologies due to their low emissions, high efficiency and ease of operation. Fuel cells operate to convert chemical energy to electrical energy. Proton exchange membrane (PEM) fuel cells comprise an anode (oxidizing electrode), a cathode (reducing electrode), and a selective electrolytic membrane disposed between the two electrodes. In a catalyzed reaction, a fuel such as hydrogen, is oxidized at the anode to form cations (protons) and electrons. The ion exchange membrane facilitates the migration of protons from the anode to the cathode. The electrons cannot pass through the membrane, and are forced to flow through an external circuit, thus providing electrical current. At the cathode, oxygen reacts at the catalyst layer, with electrons returned from the electrical circuit, to form anions. The anions formed at the cathode react with the protons that have crossed the membrane to form liquid water as the reaction product. Additionally, since the reactions are exothermic, heat is generated within the fuel cell. The half-cell reactions at the two electrodes are as follows:

$$H_2 \rightarrow 2H^+ + 2e^- \quad (1)$$

$$\tfrac{1}{2}O_2 + 2H^+ + 2e^- \rightarrow H_2O + HEAT \quad (2)$$

Various types of fuel cells have been developed employing a broad range of reactants. For example, proton exchange membrane (PEM) fuel cells are one of the most promising replacements for traditional power generation systems. PEM fuel cells comprise an anode, a cathode, and a proton exchange membrane disposed between the two electrodes. Preferably, PEM fuel cells are fuelled by pure hydrogen gas, as it is electrochemically reactive and the by-products of the reaction are water and heat. However, these fuel cells require external supply and storage devices for the hydrogen. Hydrogen can be difficult to store and handle, particularly in non-stationary applications. Conventional methods of storing hydrogen include liquid hydrogen, compressed gas cylinders, dehydrogenation of compounds, chemical adsorption into metal alloys, and chemical storage as hydrides. However, such storage systems tend to be hazardous, dangerous, expensive and bulky.

Other types of fuels have been proposed, including hydrogen-containing materials such as methanol. In some conventional systems, external reformers are employed to liberate hydrogen from the hydrogen-containing materials. The liberated hydrogen is then introduced into the fuel cell. However, the use of external reformers complicates the construction of the system, and results in a substantial loss in system efficiency. In other conventional systems, hydrogen-containing fuels may be supplied directly to the fuel cells, i.e. supplied unreformed to the fuel cell anodes. Once inside the fuel cell, the hydrogen-containing fuel may be directly oxidized or internally reformed, and subsequently oxidized to generate electricity. This occurs in some high temperature fuel cells, such as solid oxide fuel cells. These systems do not require a separate external reformer, and utilize fuels that are easier to handle than hydrogen. However, pure hydrogen typically offers better performance, and is generally more environmentally friendly than most hydrogen-containing fuels. Moreover, high temperature fuel cells operate at a minimum temperature of 600° C. These high temperatures are required to reform the hydrogen-containing materials prior to carrying out the fuel cell reactions. As such, hydrogen-containing materials are generally unsuitable for conventional PEM fuel cells that typically operate around 80° C.

Another method of generating and storing hydrogen has been recently proposed. This method uses a chemical hydride solution, such as $NaBH_4$, as a hydrogen storage medium. Generally, chemical hydride reacts with water in the presence of a catalyst to generate hydrogen, as shown in the equation below:

$$NaBH_4 + 2H_2O \rightarrow 4H_2 + NaBO_2 + HEAT \quad (3)$$

The chemical hydride solution acts as both the hydrogen carrier and the storage medium. Ruthenium, cobalt, platinum or any alloys thereof may be used to catalyze the above reaction. It is noted that hydrogen is liberated from both the sodium borohydride solution and the water. The sodium borohydride solution is relatively cheap, and is much easier and safer to handle and transport than liquid or pressurized hydrogen. As a result, there are some advantages associated with using sodium borohydride as a method of storing hydrogen as a fuel for use in fuel cells.

Known hydrogen generation systems typically employ a reactor to react chemical hydride with water in the presence of a catalyst to generate hydrogen. However, the by-product, in this example $NaBO_2$, is less soluble than the reactant $NaBH_4$. Specifically, $NaBO_2$ is only approximately 20% soluble, whereas $NaBH_4$ is approximately 40% soluble. Therefore, as hydrogen is generated, the concentration of $NaBO_2$ in the solution increases until it reaches the solubility limit of $NaBO_2$. If the reaction continues beyond this solubility limit, $NaBO_2$ will precipitate out of the solution. The solid $NaBO_2$ may clog the inlet and outlet ports of the reactor, thus impeding or blocking the flow of fluid through the reactor. In such instances, the hydrogen generation rate decreases significantly, and an insufficient amount of hydrogen is produced.

In some known systems, this problem is overcome by keeping the initial $NaBH_4$ concentration lower than the solubility of $NaBO_2$, that is, below 20%. However, this concentration is considerably lower than the solubility of $NaBH_4$, and results in a limited hydrogen storage density. As such, these systems are generally not capable of responding in real time to the fuel (hydrogen) needs of the fuel cell. This ability is referred to as load following ability.

In other conventional systems, this problem is overcome by periodically replenishing the chemical hydride solution when the concentration of $NaBO_2$ exceeds the solubility limit. However, this method is costly, wasteful, and environmentally unfriendly.

There remains a need for a chemical hydride hydrogen generation system that is adapted to reduce build-up of by-product in the chemical hydride solution. More particularly, there is a need for a chemical hydride hydrogen generation system in combination with a by-product removal system which is capable of responding in real time to the fuel (hydrogen) needs of the fuel cell.

SUMMARY OF THE INVENTION

It is an object of the present invention to provide a method and apparatus for improved by-product removal in a hydrogen generation system.

In accordance with a first aspect of the present invention, a method for removing a by-product from a chemical hydride solution is provided, where the by-product is produced in a reactor configured to contact the chemical hydride solution with a catalyst. The method comprising the steps of:

a) withdrawing at least a portion of the chemical hydride solution at a first temperature from the reactor;

b) cooling the portion of the chemical hydride solution to a second temperature below the first temperature, wherein a precipitate is formed from at least a portion of the by-product;

c) removing at least a portion of the precipitate from the portion of the chemical hydride solution;

d) heating the portion of the chemical hydride solution to a third temperature above the second temperature, wherein a remaining portion of the precipitate is dissolved in the portion of the chemical hydride solution; and e) delivering the portion of the chemical hydride solution back to the reactor.

In accordance with a second aspect of the present invention, a system for removing a by-product from a chemical hydride solution is provided. The system comprises a circuit including:

a) a reactor including a catalyst for catalyzing reaction of the chemical hydride solution to generate hydrogen;

b) a pump for withdrawing at least a portion of the chemical hydride solution at a first temperature from the reactor and returning the portion of the chemical hydride solution to the reactor;

c) a cooling means for cooling the portion of the chemical hydride solution to a second temperature below the first temperature, wherein a precipitate is formed from at least a portion of the by-product, the cooling means being located in the circuit downstream of the reactor;

d) a separating means for removing at least a portion of the precipitate from the portion of the chemical hydride solution, the separating means being located in the circuit downstream of the cooling means; and e) a heating means for heating the portion of the chemical hydride solution to a third temperature above the second temperature, wherein a remaining portion of the precipitate is dissolved in the portion of the chemical hydride solution, the heating means being located in the circuit downstream from the separating means.

Preferably, at least a part of the cooling means and at least a part of the heating means are provided by a heat exchanger, where the heat exchanger has one side located in the circuit downstream of the separating means and another side located in the circuit downstream of the reactor, thereby to transfer heat from the chemical hydride solution leaving the reactor to the chemical hydride solution flowing toward the reactor.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention and in which.

DETAILED DESCRIPTION OF THE INVENTION

The features and advantage of the present invention will become apparent in light of the following detailed description of preferred embodiments thereof.

The present invention relates to a chemical hydride hydrogen generation system coupled with a by-product removal system that is adapted to maintain the by-product concentration below the by-product solubility limit. The chemical hydride hydrogen generation system may be used to supply hydrogen to a fuel cell or any other hydrogen consuming device known in the art, such as, for example, a hydrogen internal combustion engine.

It will be understood by those skilled in the art that the chemical hydride solution referred to herein could utilize any suitable solvent known in the art. The chemical hydride is in the form of $MB_xH_y$, in which M is a metal. Preferably, the chemical hydride is one or a combination of: $NaBH_4$, $LiBH_4$, $KBH_4$, or $RbH_4$. Alternatively, the chemical hydride can comprise $NH_3BH_3$. While a variety of chemical hydride solutions could be used in the specific embodiments described herein, the preferred chemical hydride solution, as discussed below, is water and sodium borohydride ($NaBH_4$) which produces $NaBO_2$ as the by-product.

Figure 1:
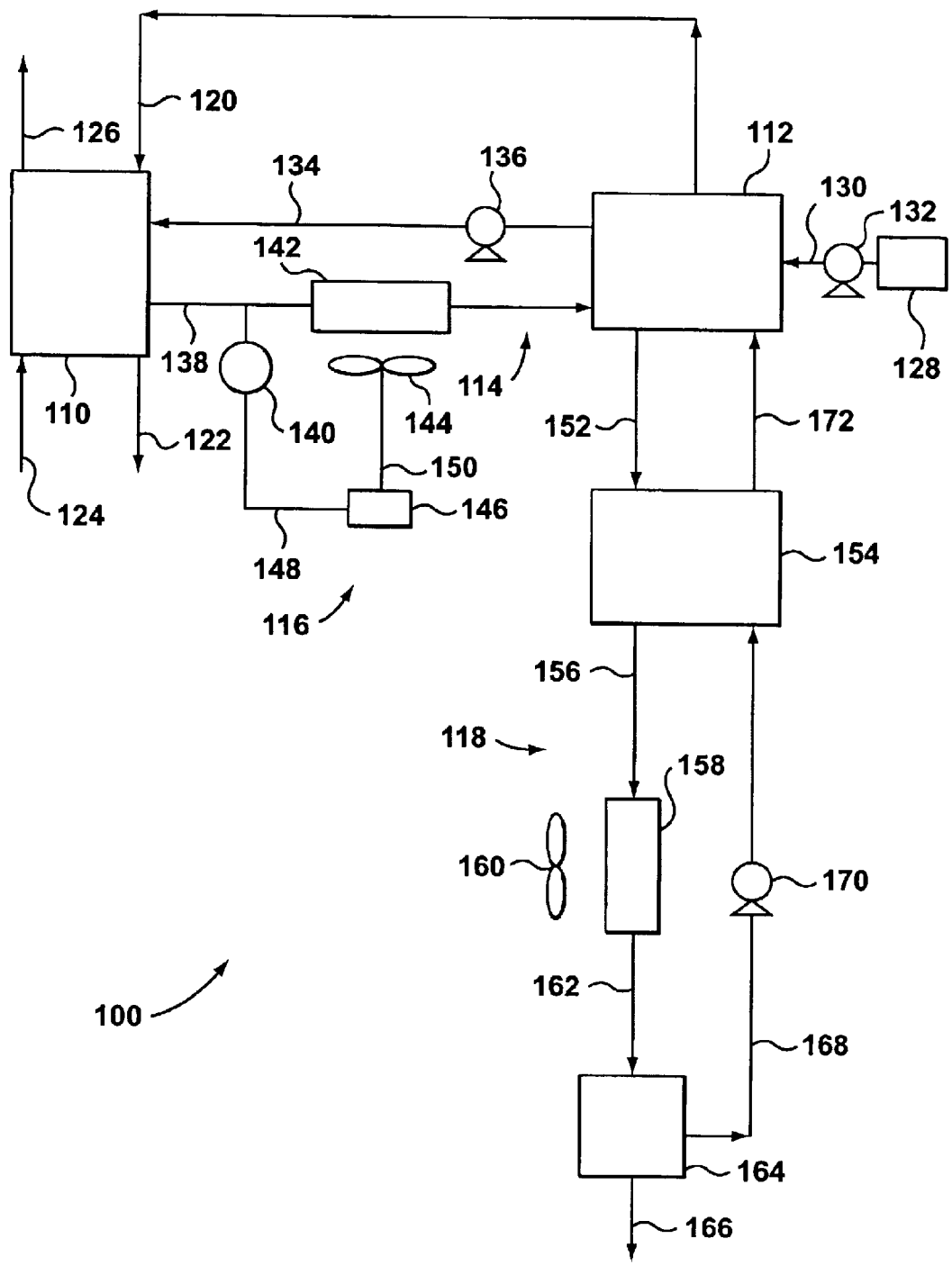
FIG. 1 shows a schematic flow diagram of a fuel cell system comprising a chemical hydride hydrogen generation system and a by-product removal system according one aspect to the present invention.

FIG. 1 shows a first embodiment of a fuel cell system 100, which includes a fuel cell stack 110. The fuel cell is described as a fuel cell stack composed of individual fuel cell units (not shown individually) as is known in the art. It will be understood that, in its simplest form, the fuel cell stack 110 could be just a single fuel cell. Preferably, the individual fuel cell units are proton exchange membrane (PEM) fuel cells that include an anode (oxidizing electrode), a cathode (reducing electrode), and a selective electrolytic membrane disposed between the two electrodes. The fuel cell stack 110 operates to convert chemical energy to electrical energy. In a catalyzed reaction, a fuel such as hydrogen, is introduced into the anode inlet of the fuel cell stack 110 via a line 120, and is oxidized at the anode to form cations (protons) and electrons. The anode exhaust is removed from the anode outlet of the fuel cell stack 110 via a line 122. The ion exchange membrane facilitates the migration of protons from the anode to the cathode. The electrons cannot pass through the membrane, and are forced to flow through an external circuit (not shown), thus providing electrical current. In a catalyzed reaction, an oxidant such as oxygen, is introduced into the cathode inlet of the fuel cell stack 110 via a line 124, and is reduced at the cathode with electrons returned from the electrical circuit, to form anions. The cathode exhaust is removed from the cathode outlet of the fuel cell stack 110 via a line 126. The anions formed at the cathode react with the protons that have crossed the membrane to form liquid water as the reaction product. Additionally, since the reactions are exothermic, heat is generated within the fuel cell stack 110.

Referring again to FIG. 1, the fuel cell system 100 includes a reactor 112, which generates the hydrogen gas from the chemical hydride solution for consumption by the fuel cell stack 110. A catalyst (not shown) is provided in the reactor 112 to catalyze the chemical hydride reaction to produce hydrogen, a by-product, and heat. The catalyst is one or a combination of: ruthenium, cobalt, platinum, or any other elements that can serve as catalysts, their compounds or their alloys. Preferably, the catalyst is in the form of a foam. Foam catalysts maximize the surface area available for chemical reactions, thus achieving a fast rate of reaction. Alternatively, the catalyst may be supplied in the form of a number of small pellets having a high surface area to volume ratio. The reactor 112 may take the form disclosed in the applicant's co-pending U.S. patent application Ser. No. 09/900,469 with additional ports for connection to the by-product removal system described below. Alternatively, the reactor 112 may be in the form of a gas-liquid separator. When hydrogen gas is required, it is removed from the reactor 112 via the line 120 and delivered to anode inlet of the fuel cell 110.

Fresh chemical hydride solution is stored in a container 128, and is delivered to the reactor 112 via a line 130 by means of a first pump 132 as required.

As shown in FIG. 1, a coolant loop 114 provides coolant flow to the fuel cell stack 110 and the reactor 112 via lines 134 and 138. Both the fuel cell stack 110 and the reactor 112 produce heat while in operation. Thus, the purpose of the coolant loop 114 is to dissipate this excess waste heat to the environment as required. It will be understood by those skilled in the art that the coolant could be any known heat exchange fluid, including but not limited to water, deionized water, oil, ethylene glycol, and/or propylene glycol. While a variety of coolants could be used for the specific embodiments described herein, the preferred coolant is deionized water.

The coolant loop 114 includes a heat exchange unit, such as a first radiator 142 and a first cooling fan 144. The first radiator 142 and first cooling fan 144 may be placed in any location in the coolant loop 114. The first radiator 142 functions as a heat exchange unit with a flow path for the coolant. The first cooling fan 144 is driven to produce a blast of air colder than the coolant temperature, which passes over the flow path of the coolant. Thus, the heat is effectively removed from the coolant through convection. The fuel cell stack 110 is provided with a coolant channel (not shown) to provide a flow path for the coolant along the length of the fuel cell stack 110.

Similarly, the reactor 112 is provided with cooling tubes (not shown) to provide a flow path for the coolant along the length of the reactor 112.

Referring again to FIG. 1, the coolant enters the coolant channel (not shown) in the fuel cell 110 via line 134 by means of a second pump 136. As the coolant travels along the length of the fuel cell stack 110, the excess heat is absorbed and removed. The coolant exits the fuel cell stack 110 via line 138. Temperature sensor 140 is disposed within line 138, and monitors the coolant outlet temperature of the fuel cell stack 110. This coolant outlet temperature can be directly related to the operating temperature of the fuel cell stack 110. The coolant then travels past the first radiator 142 and the first cooling fan 144, which may be controlled to dissipate the waste heat to the environment. Next, the coolant enters the cooling tubes (not shown) in the reactor 112 via line 138. As the coolant travels along the length of the reactor 112 and exits via line 134, the excess heat is absorbed and removed.

Referring to FIG. 1, a first feedback control system is shown generally at 116. The feedback control system 116 includes a control unit 146, the temperature sensor 140, and the cooling fan 144. The control unit 146 is electrically connected to the temperature sensor 140 and the cooling fan 144 via wires 148 and 150, respectively. The temperature sensor 140 monitors the cooling outlet temperature of the fuel cell stack 110, and sends electronic signals to the control unit 146 via wire 148. The control unit 146 is programmed to maintain a pre-set operating temperature of the fuel cell stack 110.

Preferably, the pre-set operating temperature of the fuel cell stack 110 is 80° C., although the temperature may be set at any temperature within the range of 60° C. to 100° C. Thus, if the coolant outlet temperature is above the pre-set operating temperature, the control unit 146 will send electronic signals via wire 150 to the cooling fan 144 to turn it on. On the other hand, if the coolant outlet temperature is below the pre-set operating temperature, the control unit 146 will send electronic signals via wire 150 to the cooling fan 144 to turn it off. Thus, the first feedback control system 116 maintains a constant operating temperature of the fuel cell stack 110, and a constant operating temperature of the reactor 112 during steady state operation.

Continuing to refer to FIG. 1, the by-product removal system is shown generally at 118. It will be understood that a person skilled in the art can readily identify commercially available conventional devices that can be used for the components described in FIG. 1. The by-product removal system 118 includes a first heat exchanger 154, a cooling means such as a second radiator 158 in combination with second fan 160, and a third pump 170. The by-product removal system 118 also includes a separating means 164 for removing the by-product from the chemical hydride solution. The separating means 164 is preferably a combination of a gravity separator vessel followed by a cross-flow filtration element to ensure a more complete removal of solid by-product that may be entrained in the supernatant solution leaving the settling vessel. Alternatively, the separating means 164 may be any other conventional component or a combination of conventional components suitable for separating the by-product precipitate from the hydride solution. For example, the separating means could be a gravity settling tank, a filter, or a combination of the two. Suitable filters include a cross-flow filter, a plate and frame filter, a leaf filter, and a belt filter. Alternatively, a centrifuge may be employed to perform the separation step. The purpose of the separation means is to separate and remove the by-product from the system, thus producing a by-product lean solution.

The by-product rich solution is withdrawn from the reactor 112 at a first temperature (discussed in detail below) via line 152 by a pump 170, and enters a first heat exchanger 154 where it is cooled down to an intermediate temperature (discussed in detail below). The by-product rich solution exits the first heat exchanger 154 via line 156, and passes into the second radiator 158 coupled to a second cooling fan 160, where it is cooled down further to a second temperature (discussed in detail below). The purpose of the second radiator 158 and the second cooling fan 160 is to cool the by-product rich solution to the second temperature sufficient to cause precipitation and preferably crystallization of at least a portion of the by-product. The solution exits the second radiator 158 via line 162, and enters into the separating means 164 which separates and remove the portion of the precipitated by-product $NaBO_2$. At least a portion of the solid by-product precipitate is removed from the separating means 164 via line 166. The solid by-product can be reprocessed in a separate reprocessing system (not shown). Alternatively, the $NaBO_2$ by-product can be sold as borax. The by-product lean solution exits the separating means 164 via line 168, and enters the first heat exchanger 154 where it is heated to a third temperature. The by-product lean solution is the supplied back to the reactor 112 via line 172. This by-product removal system 118 provides the advantage of reducing the build-up of by-product in the reactor 112 by maintaining the concentration of the by-product below the solubility limit.

The first heat exchanger 154 can be any type known in the art. For example, the first heat exchanger 154 can be a plate and frame heat exchanger. The first heat exchanger 154 removes some of the heat from the solution being withdrawn from the reactor 112 in line 152, and transfers the heat back to the solution being returned to the reactor 112 via line 172. Thus, some of the energy is conserved within the fuel cell system 100.

Alternatively, the first heat exchanger 154 could be replaced by a heater (not shown) to provide the function of reheating the solution prior to introduction back into the gas-liquid separator 112. However, this arrangement is not as efficient as employing the first heat exchanger 154, since additional outside energy would have to be supplied to operate the system.

The cooling means can be any type known in the art, and is not limited to a radiator 158 and cooling fan 160 arrangement. For example, the cooling means may be a conventional refrigeration unit, a heat pump, a Peltier junction, or any other known heat exchanging device. The purpose of the cooling means is to cause precipitation and preferably crystallization of at least a portion of the by-product. The solubility of the by-product is directly proportional to the temperature of the solution. Thus, as the temperature of the solution is lowered, the solubility of the by-product in the solution decreases. This causes crystallization and precipitation of the by-product from the solution.

Referring to FIG. 1, the operation of the by-product removal system 118, where a $NaBH_4$ solution is used to generate hydrogen will now be described.

The solution is catalyzed in the reactor 112 to produce hydrogen, $NaBO_2$ by-product and heat. The solution is withdrawn from the reactor 112 via line 152 at the first temperature of preferably around 50° C., although the temperature could be in the range of between about 30° C. to 60° C. The temperature of the chemical hydride solution in the reactor 112 is kept relatively constant during operation by the first coolant loop 114.

The withdrawn solution in line 152 enters one side of the first heat exchanger 154, where it is cooled down to an intermediate pre-set temperature of preferably 35° C. Again, this temperature may be in the range of 25° C. to 55° C.

The solution leaves the first heat exchanger via line 156 and enters the second radiator 158, where it is cooled down further by the second cooling fan 160 to the second temperature of, for example 20° C. Again, this temperature could be in the range of 15° C. to 45° C. The decrease in temperature causes crystallization and precipitation of at least a portion of the by-product out of the solution.

The solution leaves the second radiator 158 via line 162 and enters the separating means 164, where at least a portion of the by-product crystals are separated and removed from the solution. Preferably, the separating means 164 removes 80% of the solid by-product from the system, although the removal could be in the range of about 50% to 100%.

To illustrate the quantity of by-product removal that can be expected from this invention, the temperatures specified in the above paragraphs are assumed for streams in lines 156 and 162 to be 35° C. and 25° C., respectively. The solubilities of sodium borate by-product are 360 grams per liter at 35° C., and 260 grams per liter at 20° C. For a system that produces 5 liters per minute of hydrogen gas at standard conditions, approximately 2.07 grams of $NaBH_4$ are consumed, according to Equation 3, above. Approximately 3.7 grams of sodium borate per minute are produced that must be removed from the reacting solution in reactor 112. If the system operates such that the concentration of $NaBO_2$ by-product is maintained at 360 grams per liter, a flow rate of 46 millilitres per minute must be maintained for streams in lines 152 and 156 to ensure complete removal of all the by-product that appears in reactor 112. It will be appreciated by those skilled in the art that the actual operating temperatures and flow rates can differ significantly from the above values, which are stated by way of illustration, in the embodiment of the invention. Other factors, such as the required heat removal rate from the system, must also be considered to optimize the actual concentrations, temperatures and flow rates in the embodiment of the invention.

The solution leaves the separating means 164 via line 168 and enters the first heat exchanger 154, where it is heated up to a third temperature of preferably 35° C. Again, for example, this temperature could be in the range of 25° C. to 55° C. At this point, the concentration of the $NaBO_2$ by-product in the $NaBH_4$ solution is well below the solubility limit at the temperature of the reactor 112. As such, when the solution enters the reactor 112 via line 172, there risk of localized precipitation of the by-product is reduced.

Figure 2:
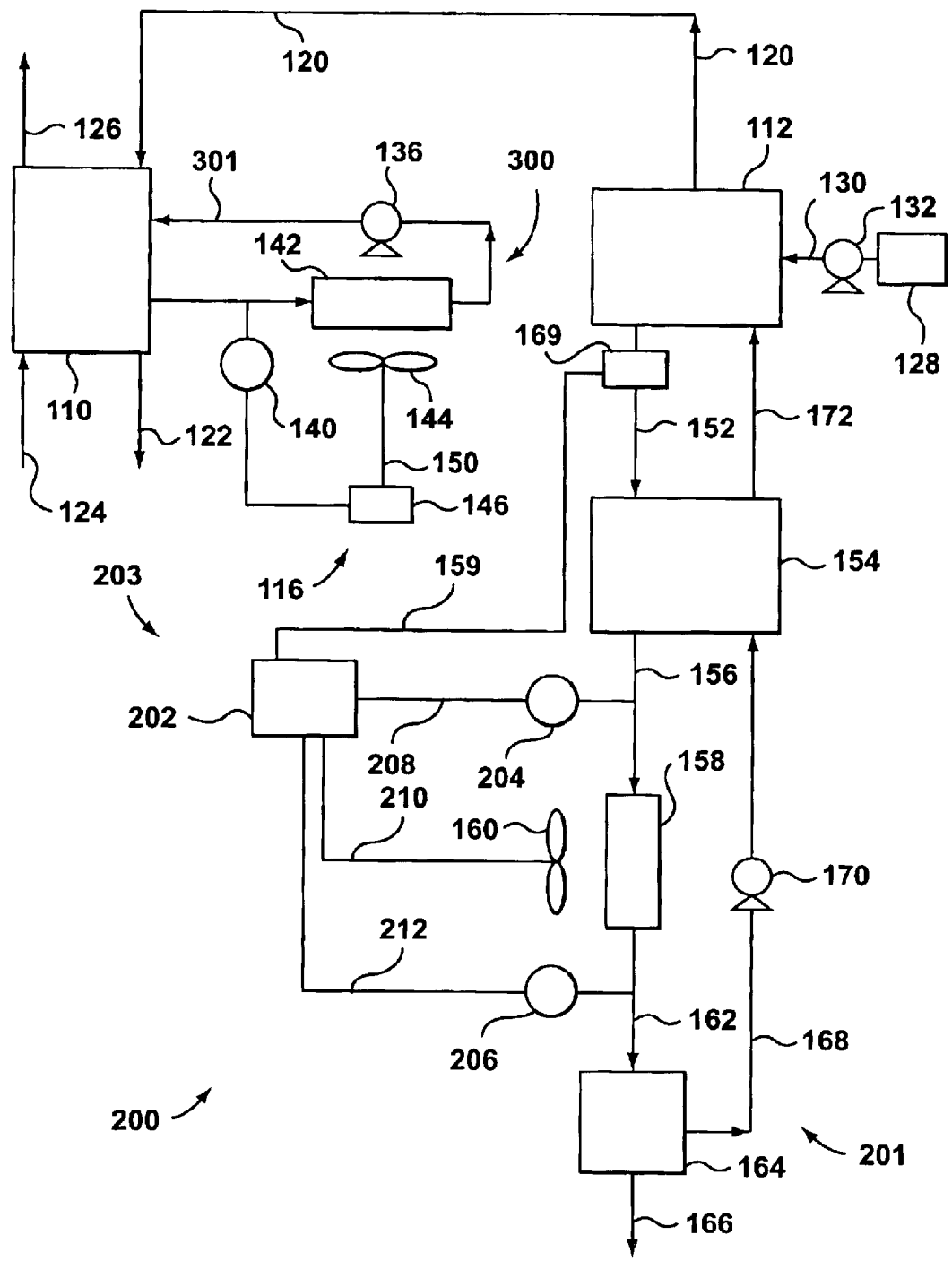
FIG. 2 shows a schematic flow diagram of a chemical hydride generation system and a by-product removal system according to an alternative aspect of the present invention.

FIG. 2 shows a schematic flow diagram of a second embodiment of a fuel cell system 200 where components identical to those shown in FIG. 1 are denoted by identical reference numbers. In this embodiment, a by-product removal system 201 also provides the function of cooling the reactor 112. That is, the operating temperature of the reactor 112 is regulated by the operation of the by-product removal system 201.

Referring to FIG. 2, the by-product removal system 201 is identical to by-product removal system 118 (shown in FIG. 1 and described in detail above), except for the addition of a second feedback control system 203. The second feedback control and a third temperature sensor 206. The system 203 includes a second control unit 202, a second temperature sensor 204, second control unit 202 is electrically connected to the second temperature sensor 204, second cooling fan 160, and third temperature sensor 206 via wires 208, 210, and 212, respectively. Control unit 202 may be either a commercially available dedicated temperature/mass flow controller, a programmable logic controller, or part of a process control computer. The operation of the by-product removal system 201 remains the same as the by-product removal system 118 (shown in FIG. 1), with the exception of the second control unit 202 controlling the amount of cooling in the second radiator 158 and a mass flow controller 169 connected to the second control unit 202 by wire 159. Both temperature sensors 204 and 206 are connected electrically to second control unit 202 which modulates the rotational speed and the duty cycle of cooling fan 160 so that the temperature difference between streams in lines 156 and 162 are maintained at an appropriate value. In addition, the flow rate of solution that is diverted into the by-product removal system 200 may be modulated by means of the mass flow controller 169 to accomplish a greater degree of heat removal from the system and by-product removal from the system. It will be appreciated that the heat removal capacity of the second radiator 158 and second cooling fan 160 is selected to allow for the appropriate temperature difference to be maintained between the two streams in lines 156 and 162 within the duty cycle and speed of the cooling fan. For example, it was assumed in the first embodiment that an appropriate temperature difference of 10° C. would be appropriate for the removal of all the NaBO$_2$ produced by hydrogen generation in reactor 112, for a flow rate of 46 millilitres per minute for streams in lines 156 and 162. A heat exchanger of suitable capacity would be selected to remove the amount of heat necessary to lower the temperature of the stream in line 156 to that desired for stream in line 162. It will be appreciated that the scope of this invention is in no way limited to the operating parameters, or to the control configurations, stated herein to describe the embodiment of the present invention.

It will also be appreciated that the flow rate through streams in lines 156 and 162 can be set independently of the temperature difference between them. This is yet another feature of the present invention that will allow for better thermal control of the system, as well as by-product removal. There exist operating conditions where the temperature difference between streams in lines 156 and 162 that affect the heat removal rate of the heat of reaction in reactor 112 from stream in line 156 may not correspond to those for optimal removal of by-product NaBO$_2$ from the system. The heat removal rate depends both on the temperature difference between that of the stream in line 156 (the stream entering the second radiator 158) and that of the stream in line 162 (the stream leaving the second radiator 158), the heat capacity of the solution flowing through these streams, and the flow rate of the streams. The amount of by-product NaBO$_2$ removed from the system depends both on the change in solubility of by-product NaBO$_2$ through the temperature difference between streams in lines 156 and 162, as well as the flow rate through these streams. By setting the temperature difference between streams in lines 156 and 162, and setting the flow rate through these streams by means of mass flow controller 169, it is possible to optimize the heat removal and by-product removal rates from reactor 112, while at the same time optimizing the temperature for the hydrogen generation reaction that occurs in reactor 112.

This second embodiment of the invention, with independent thermal management of the hydrogen generation reactor 112, by-product removal system 201, and fuel cell system 200, will also allow for optimization of the fuel cell heat removal rate, as well as its operating temperature.

As shown in FIG. 2, a dedicated cooling loop 300 is provided in the fuel cell system 200 in order to control the reaction temperature in the fuel cell 110. The dedicated cooling loop 300 includes a pump 136, first radiator 142, and first feedback control system 116 which operate as previously described. The pump 136 circulates the coolant through these elements of dedicated cooling loop 300 via line 301.

While the above description constitutes the preferred embodiments, it will be appreciated that the present invention is susceptible to modification and change without departing from the fair meaning of the proper scope of the accompanying claims. It will be appreciated that the shapes or models of the reactor, heat exchanger, liquid-gas separator, etc plates of the present invention do not form part of this invention and are not limited to those disclosed in the above description. In addition, the chemical hydride solution used to generate hydrogen is not limited to borohydride water solution. Rather, the hydride can comprise one hydride or a combination of different hydrides, such as NaBH$_4$, LiBH$_4$, KBH$_4$, RbH$_4$, or the like. Additionally, the number and arrangement of the components in the system might be varied, but may still fall within the scope and spirit of the claims.

What is claimed is:

1. A method for removing a by-product from a chemical hydride solution, the by-product being produced in a reactor configured to contact the chemical hydride solution with a catalyst, the method comprising the steps of:
    a) withdrawing at least a portion of the chemical hydride solution at a first temperature from the reactor;
    b) cooling the portion of the chemical hydride solution to a second temperature below the first temperature, wherein a precipitate is formed from at least a portion of the by-product;
    c) removing at least a portion of the precipitate from the portion of the chemical hydride solution;
    d) heating the portion of the chemical hydride solution to a third temperature above the second temperature, wherein a remaining portion of the precipitate is dissolved in the portion of the chemical hydride solution; and
    e) delivering the portion of the chemical hydride solution back to the reactor.

2. The method of claim 1, wherein step (c) comprises removing the portion of precipitate from the portion of the chemical hydride solution with a filter.

3. The method of claim 2, that includes providing the filter as a cross-flow membrane filter.

4. The method of claim 1, wherein step (c) comprises removing the portion of precipitate from the portion of the chemical hydride solution with a centrifuge.

5. The method of claim 2, that includes providing a gravity settling tank upstream of the filter, to assist with removing the portion of the precipitate.

6. The method of claim 1, wherein the first temperature is approximately in the range of 30° C. to 60° C.

7. The method of claim 6, wherein the first temperature is approximately 50° C.

8. The method of claim 6, wherein the second temperature is approximately in the range of 15° C. to 45° C.

9. The method of claim 8, wherein the second temperature is approximately 20° C.

10. The method of claim 6, wherein the third temperature is approximately in the range of 25° C. to 55° C.

11. The method of claim 10, wherein the third temperature is approximately 35° C.

12. The method of claim 1, that includes cooling the portion of the chemical hydride solution in a heat exchanger to an intermediate temperature, lower than the first temperature, but higher than the second temperature, and further cools the portion of the chemical hydride solution to the second temperature in a radiator downstream of the heat exchanger.

13. The method of claim 12, wherein the intermediate temperature is approximately in the range of 25° C. to 55° C.

14. The method of claim 13, wherein the intermediate temperature is approximately 35° C.

15. The method of claim 12, that includes delivering the portion of the chemical hydride solution back through the heat exchanger to heat the portion of the chemical hydride solution to the third temperature.

16. The method of claim 1, that includes cooling the portion of the chemical hydride solution to the second temperature in a radiator, and heating the portion of the chemical hydride solution to the third temperature in a heater.

17. The method of claim 1, wherein step (c) comprises removing approximately 50% to 100% of the precipitate.

18. The method of claim 17, wherein step (c) comprises removing approximately 80% of the precipitate.

19. A system for removing a by-product from a chemical hydride solution, the system comprising a circuit including:

a) a reactor including a catalyst for catalyzing reaction of the chemical hydride solution to generate hydrogen;

b) a pump for withdrawing at least a portion of the chemical hydride solution at a first temperature from the reactor and returning the portion of the chemical hydride solution to the reactor;

c) a cooling means for cooling the portion of the chemical hydride solution to a second temperature below the first temperature, wherein a precipitate is formed from at least a portion of the by-product, the cooling means being located in the circuit downstream of the reactor;

d) a separating means for removing at least a portion of the precipitate from the portion of the chemical hydride solution, the separating means being located in the circuit downstream of the cooling means; and e) a heating means for heating the portion of the chemical hydride solution to a third temperature above the second temperature, wherein a remaining portion of the precipitate is dissolved in the portion of the chemical hydride solution, the heating means being located in the circuit downstream from the separating means.

20. The system of claim 19, wherein at least a part of the cooling means and at least a part of the heating means are provided by a heat exchanger, the heat exchanger having one side located in the circuit downstream of the separating means and another side located in the circuit downstream of the reactor, thereby to transfer heat from the chemical hydride solution leaving the reactor to the chemical hydride solution flowing toward the reactor, and wherein the cooling means additionally comprises a radiator and a cooling fan.

21. The system of claim 20, wherein the heat exchanger is adapted to cool the chemical hydride solution to an intermediate temperature between the first temperature and the second temperature.

22. The system of claim 20, wherein the heat exchanger comprises a plate and frame heat exchanger.

23. The system of claim 21, wherein the radiator and cooling fan are adapted to cool the chemical hydride solution to the second temperature.

24. The system of claim 23, further comprising an upstream temperature sensor located upstream of the radiator, a downstream temperature sensor located downstream of the radiator, and a control means for controlling the cooling fan, wherein the upstream and downstream temperature sensors being adapted to measure the temperature of the chemical hydride solution and communicate the temperature to the control means.

25. The system of claim 24, wherein the upstream sensor is located between the heat exchanger and the radiator, and the downstream sensor is located between the radiator and the separating means.

26. The system of claim 24, further comprising a mass flow controller located upstream of the heat exchanger and electrically connected to the control means, the mass flow controller being adapted to control the flow rate of the chemical hydride solution into the heat exchanger.

27. The system of claim 19, wherein the catalyst is selected from one or more members of the group comprising ruthenium, cobalt, and platinum.

28. The system of claim 27, wherein the catalyst is in the form of a foam.

29. The system of claim 19, wherein the reactor comprises a gas liquid separator.

30. The system of claim 19, wherein the separating means comprises a gravity settling vessel.

31. The system of claim 30, wherein the separating means further comprises a filter located downstream of the gravity separator vessel.

32. The system of claim 31, wherein the filter is selected from a crossflow filter, a plate and frame filter, a leaf filter, and a belt filter.

33. The system of claim 19, wherein the heating means comprises a heater.

34. The system of claim 19, wherein the cooling means is selected from one or more members of a group comprising a refrigeration unit, a heat pump, and a Peltier junction.

* * * * *